(12) United States Patent
Sethumadhavan et al.

(10) Patent No.: US 11,923,762 B2
(45) Date of Patent: Mar. 5, 2024

(54) POWER CONVERTERS WITH REDUCED RIPPLE VOLTAGE

(71) Applicant: TEXAS INSTRUMENTS INCORPORATED, Dallas, TX (US)

(72) Inventors: Sachin Sethumadhavan, Bangalore (IN); Sayantan Gupta, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 185 days.

(21) Appl. No.: 17/538,509

(22) Filed: Nov. 30, 2021

(65) Prior Publication Data

US 2023/0170787 A1  Jun. 1, 2023

(51) Int. Cl.
*H02M 1/14* (2006.01)
*H02M 3/158* (2006.01)

(52) U.S. Cl.
CPC ............ *H02M 1/14* (2013.01); *H02M 3/158* (2013.01)

(58) Field of Classification Search
CPC ................................. H02M 1/14; H02M 3/158
See application file for complete search history.

(56) References Cited

U.S. PATENT DOCUMENTS

| | | | | |
|---|---|---|---|---|
| 10,511,226 B1 * | 12/2019 | Gurlahosur | ......... | H02M 3/1582 |
| 2011/0018515 A1 * | 1/2011 | McCloy-Stevens | ......... | H02M 3/1588 323/284 |
| 2012/0153921 A1 * | 6/2012 | Brokaw | ............... | H02M 3/156 323/288 |
| 2013/0176004 A1 * | 7/2013 | Lai | ...................... | H02M 3/1563 323/234 |
| 2015/0137700 A1 * | 5/2015 | Evans | .................... | H05B 45/46 307/31 |
| 2016/0118894 A1 * | 4/2016 | Zhang | .................. | H02M 3/158 323/271 |
| 2017/0077798 A1 * | 3/2017 | Drda | .................... | H02M 3/3376 |
| 2017/0201086 A1 * | 7/2017 | Chen | ...................... | H02H 9/025 |
| 2017/0279352 A1 * | 9/2017 | Kosaraju | ............. | H02M 3/1563 |

* cited by examiner

*Primary Examiner* — Rafael O De Leon Domenech
(74) *Attorney, Agent, or Firm* — Charles F. Koch; Frank D. Cimino

(57) ABSTRACT

An example circuit includes a supply comparator having a supply input, a supply reference input and a supply comparator output. The supply input is coupled to a supply input terminal, and the supply reference input is configured to receive a supply reference voltage. A controller has a comparator input, a high-side output and a low-side output. The comparator input is coupled to the supply comparator output. A high-side switch having a control input. The high-side switch is coupled between the supply input and a switch output terminal, and the high-side output is coupled to the control input of the high-side switch. A low-side switch has a control input. The low-side switch is coupled between the switch output terminal and a ground terminal, and the low-side output is coupled to the control input of the low-side switch.

19 Claims, 5 Drawing Sheets

POWER CONVERTERS WITH REDUCED RIPPLE VOLTAGE

TECHNICAL FIELD

This description relates to power converters with reduced ripple voltage.

BACKGROUND

Power supply circuits can be implemented in a variety of different ways. A switching power converter circuit can be configured activate one or more switches to convert an input voltage to an output voltage. As an example, a buck regulator operating in a discontinuous conduction mode has a current limit threshold set to about twice the maximum load current. The ripple for a given load is thus fixed. As the input supply voltage increases, the frequency of switching is increased to lower the ripple voltage at the output. However, at lower supply voltages, the inductor current charging is slower, resulting in a lower switching frequency and hence increased ripple voltage.

SUMMARY

An example circuit includes a supply comparator having a supply input, a supply reference input and a supply comparator output. The supply input is coupled to a supply input terminal, and the supply reference input is configured to receive a supply reference voltage. A controller has a comparator input, a high-side output and a low-side output. The comparator input is coupled to the supply comparator output. A high-side switch has a control input. The high-side switch is coupled between the supply input and a switch output terminal, and the high-side output is coupled to the control input of the high-side switch. A low-side switch has a control input. The low-side switch is coupled between the switch output terminal and a ground terminal, and the low-side output is coupled to the control input of the low-side switch.

Another described example provides a power converter circuit. The power converter circuit includes an output stage and a controller. The output stage includes high-side and low-side switches coupled between a supply terminal and a ground terminal. The controller is configured to provide high-side and low-side control signals to operate the output stage to provide a regulated voltage responsive to an operating state of the controller. The controller is configured to transition from an intermediate state to a high-side on (HSON) state, in which the high-side control signal is provided to turn on the high-side switch, responsive to (i) the supply terminal having a voltage less than a supply voltage threshold, (ii) the regulated voltage having a voltage less than a regulated voltage threshold, and (iii) current through the high-side switch being less than a current limit threshold.

Another described example provides a system including a main power supply and a power converter. The main power supply has a supply output, and the main power supply configured to provide a supply voltage at the supply output. The power converter includes an output stage including high-side and low-side switches coupled between a supply terminal and a ground terminal. Each of the high-side and low-side switches is coupled to a switch output terminal, and the supply terminal coupled to the supply output. The power converter also includes a controller configured to provide high-side and low-side control signals to operate the output stage to provide a regulated voltage at a feedback terminal responsive to an operating state of the controller. The controller is configured to enable a direct transition from an intermediate state, in which the high-side switch is off, to a high-side on (HSON) state, in which the high-side control signal is provided to turn on the high-side switch, responsive to the supply voltage being less than a low supply voltage threshold. An inductor or resistor is coupled between the switch output terminal and the feedback terminal, and a capacitor is coupled between the feedback terminal and the ground terminal.

DETAILED DESCRIPTION

This description relates to a power converter circuit configured to exhibit low output voltage ripple across a wide range of supply voltages. For example, the power converter circuit includes a controller and an output stage. The output stage includes high-side and low-side switches coupled between a supply terminal and a ground terminal. The controller is configured to provide high-side and low-side control signals to operate the output stage to provide a regulated output voltage. In an example, the controller includes a state machine configured to transition to a high-side on (HSON) operating state, in which the high-side control signal is provided to turn on the high-side switch, responsive to (i) the supply terminal having a supply voltage less than a supply voltage threshold, (ii) a feedback input having a voltage less than a feedback voltage threshold and (iii) current through the high-side switch being less than a current limit. The controller thus can be configured to use voltage at the supply terminal to enable a transition back to the HSON state when the supply voltage is below the supply voltage threshold. The transition to HSON, which is enabled responsive to a lower supply voltage, results in increasing the switching frequency of the output stage so output current ripple is reduced, which further results in reduced output voltage ripple.

At higher supply voltages (e.g., above the supply voltage threshold), the controller can be configured to disable such transition from another state to the HSON state until an output current reaches zero for next recharge cycle. In an example, the controller can also condition the transition back to the HSON state responsive to a feedback voltage representative of the regulated output voltage falling below a regulated voltage threshold (e.g., set by a voltage reference). However, at such higher supply voltages, as the supply voltage the current also increases. The increase in current at the higher supply voltages results in an increased switching frequency of the output stage so the ripple voltage at the output can improve at higher voltages without enabling earlier transitions to the HSON state.

Figure 1:
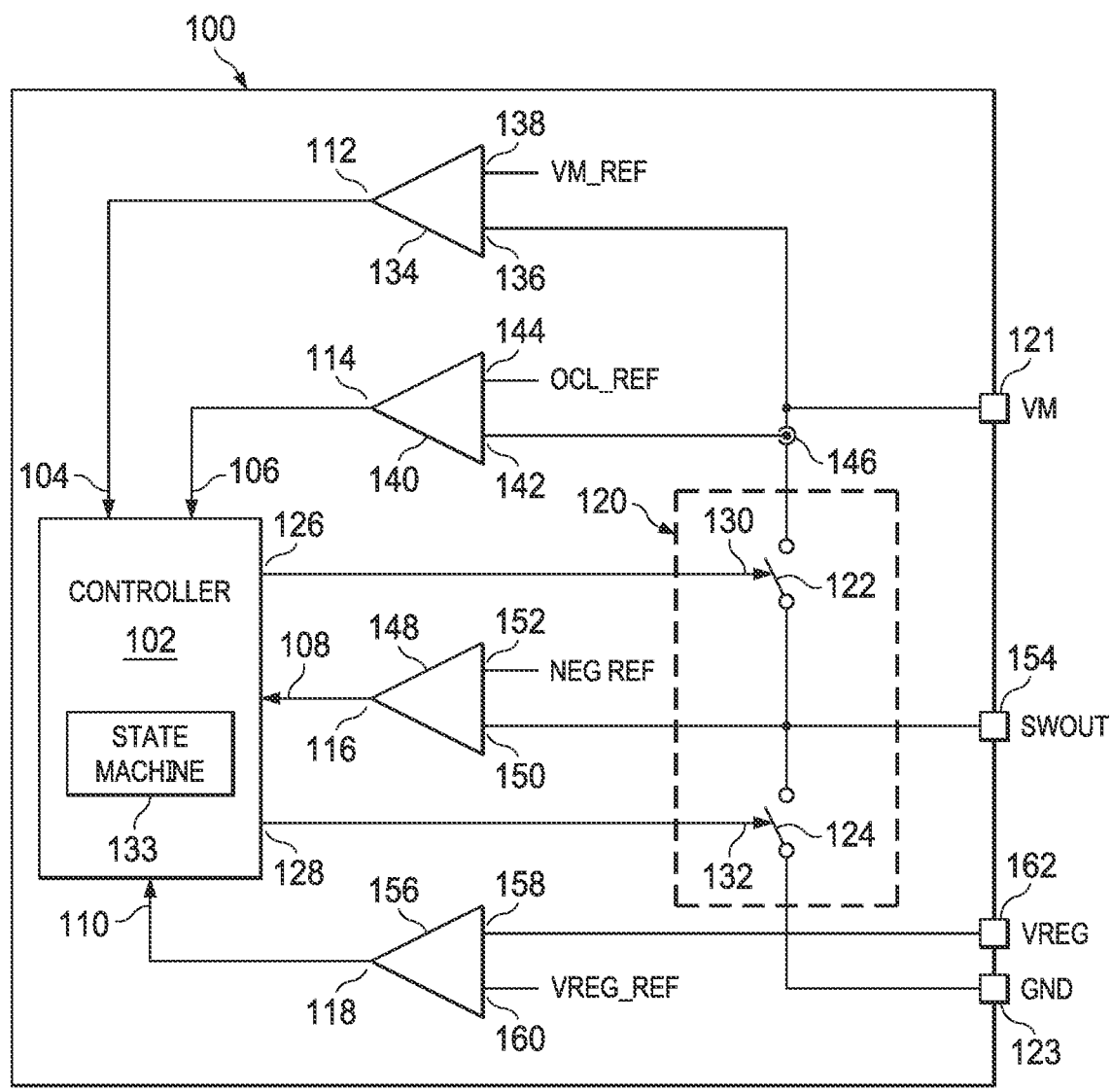
FIG. 1 illustrates an example of a power converter circuit.

FIG. 1 illustrates an example of a power converter circuit 100. The power converter circuit can be configured as a buck converter or buck-boost converter circuit depending on application requirements. For example, the power converter circuit 100 further can be implemented in any of a variety of electronic devices, such as motor drive systems, computers, portable electronics, medical devices, or other electronic devices. As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate, such as a die or chip). Thus, the power converter circuit 100 can be implemented on a semiconductor substrate.

In the example of FIG. 1, the power converter circuit 100 includes a controller 102 having comparator inputs 104, 106, 108 and 110. The comparator inputs 104, 106, 108 and 110 are coupled to respective comparator outputs 112, 114, 116 and 118. The power converter circuit 100 also includes an output stage 120 including high-side and low-side switches 122 and 124, respectively, coupled between a main supply terminal 121 and a ground terminal (GND) 123. The main supply terminal 121 is configured to receive a main supply voltage, shown as VM. In an example, the high-side and low-side switches 122 and 124 are implemented as metal oxide semiconductor field effect transistors (MOSFETs or FETs) having body diodes. In other examples, the switches 122 and 124 can be implemented as other types of transistors, such as insulated-gate bipolar transistors (IGBTs), bipolar junction transistors (BJTs), laterally-diffused metal-oxide semiconductor (LDMOS) transistors, and the like.

The controller 102 also has a high-side output 126 coupled to a control input 130 of the high-side switch 122, and a low-side output 128 coupled to a control input 132 of the low-side switch 124. The controller 102 is configured to provide control signals at its respective outputs 126 and 128 responsive to an operating state of the controller. The controller includes a state machine (e.g., a finite state machine) 133 configured to set the operating state of the controller responsive to signals received at the respective comparator inputs 104, 106, 108 and 110.

In the example of FIG. 1, the power converter circuit 100 includes a supply comparator 134 having a supply input 136 coupled to the main supply terminal 121 and a supply reference input 138 configured to receive a supply reference voltage, shown as VM_REF. As described herein, reference voltages that are provided to inputs of comparators are also referred to as thresholds. For example, the reference voltage VM_REF is representative of a low supply voltage threshold (e.g., less than ½ a maximum supply voltage for the converter circuit 100). The voltage at the supply input 136 can be the actual supply voltage VM at the terminal 121. Alternatively, the voltage at the supply input 136 can be proportional to VM, such as provided by a voltage divider circuit coupled between the terminal 121 and the input 136. The comparator is configured to provide a comparator output signal at comparator output 112 based on a comparison of a voltage at 136, which is representative of the voltage VM at the supply terminal 121, and the supply reference voltage VM_REF. For example, the comparator provides a high (e.g., logic 1) comparator output signal responsive to VM>VM_REF and provides a low (e.g., logic 0) comparator output signal responsive to VM<VM_REF.

The power converter circuit 100 includes a current limit comparator 140 having a current input 142 and a current reference input 144. The current input 142 is coupled to a current sensor 146, which is configured to provide a current signal representative of current through the high-side switch 122. The current reference input 144 is configured to receive a current reference signal, shown as OCL_REF. For example, the current reference signal OCL_REF is representative of a low current limit threshold set to a current below a high current limit. The comparator 140 is configured to provide a comparator output signal at comparator output 114 based on a comparison of the current sensor signal at 142 voltage and the current reference signal OCL_REF. For example, the comparator 140 provides a high (e.g., logic 1) comparator output signal at 114 responsive to the current sensor signal being greater than OCL_REF and provides a low (e.g., logic 0) comparator output signal responsive to current sensor signal being less than OCL_REF.

The power converter circuit 100 also includes a switch comparator 148 having a switch input 150 and a switch reference input 152. The switch input 150 is coupled a switch output terminal 154, which is also coupled to respective terminals of the high-side and low-side switches 122 and 124. The switch input 150 is configured to receive an output switching signal, shown as SWOUT, which is provided to the switch output terminal 154. In an example, a passive network (not shown) can be coupled between the switch output terminal 154 and ground terminal 123. In an example where the converter 100 is implemented on an IC, the passive network can include external components. The switch reference input 152 is configured to receive a negative reference signal, shown as NEG_REF. The switch comparator 148 is configured to provide a comparator output signal at comparator output 116 based on a comparison of the switching signal SW at 154 voltage and the negative reference signal NEG_REF. For example, the comparator 148 provides a high (e.g., logic 1) comparator output signal at 116 responsive to the switching signal SW being greater than NEG_REF and provides a low (e.g., logic 0) comparator output signal responsive to the switching signal being less than NEG_REF. In an example, the negative reference signal NEG_REF is set to a negative diode drop (e.g., about 0.7 V) to be representative of current flowing through a body diode of the low-side switch 124 when the low side switch is off.

The power converter circuit 100 also includes a feedback comparator 156 having a regulated voltage input 158 and a feedback reference input 160. The regulated voltage input 158 is coupled to a feedback terminal 162, which receives a feedback signal, shown as VREG. For example, the feedback signal VREG is representative of a regulated output voltage supplied by the power converter 100 to a load, which can be coupled to the feedback terminal 162. The feedback reference input is configured to receive a feedback reference voltage, shown as VREG_REF. In an example the feedback reference voltage VREG_REF is provided by a voltage reference circuit. The voltage reference circuit can configured to set the feedback reference voltage VREG_REF to a configurable responsive to an input signal. The feedback comparator 156 is configured to provide a comparator output signal at comparator output 118 based on a comparison of the feedback signal VREG at 162 and the feedback reference signal VREG_REF. For example, the comparator 156 provides a high (e.g., logic 1) comparator output signal at 118 responsive to the switching signal VREG>VREG_REF and provides a low (e.g., logic 0) comparator output signal responsive to the VREG<VREG_REF.

During normal operation, after power up or a reset (e.g., power on reset), the controller 102 is configured to use the state machine 133 to transition between operating states for controlling the switches 122 and 124 to supply the regulated voltage VREG at 162. For example, the state machine 133 includes an HSON state, a tristate state, a recirculation state and a wait state. In the HSON state, the high-side switch 122 is on and the low-side switch 124 is off so current is supplied through the high-side switch to charge a capacitor (not shown), which can be coupled to the feedback terminal 162. The state machine 133 is configured to transition from the HSON state to the tristate state responsive to the comparator signals at 114 or 118. For example, the HSON-to-tristate transition occurs responsive to current through the high-side switch exceeding the current limit threshold OCL_REF and/or VREG>VREG_REF. The state machine 133 is also configured to transition from the tristate state to the recirculation state responsive to the comparator signal provided by the switch comparator at 116. For example, the tristate-to-recirculation transition occurs responsive to SW<NEG_REF.

In examples in which the supply voltage VM exceeds the supply threshold VM_REF (e.g., a low voltage reference), the state machine 133 is configured to proceed to the wait state before returning to the HSON state. As described herein, however, if the supply voltage VM is less the supply threshold VM_REF, which is representative of a low supply voltage condition, the state machine 133 is configured to enable transition from the tristate state or the recirculation state directly to the HSON state. For example, while the direct transition to HSON is enabled (responsive to VM<VM_REF), the state machine 133 is configured to transition from the tristate state to the HSON state, responsive to the comparator output signal at 118 having a low (e.g., logic 0), which is representative of VREG<VREG_REF. Also, while the direct transition to HSON is enabled, the state machine 133 is configured to transition from the tristate state to the HSON state, responsive to the comparator output signal at 114 having a low (e.g., logic 0), which is representative of the current sensor signal being less than OCL_REF. While the direct transition to HSON is enabled (responsive to VM<VM_REF), the state machine 133 can be configured to transition directly from the recirculation state to the HSON state responsive to the same condition(s) as used for direct tristate-to-HSON state transition described above. That is, while the direct transition to HSON is enabled, the state machine 133 is configured to transition from the recirculation state to the HSON state responsive to current sensor signal being less than OCL_REF and/or VREG<VREG_REF. In the HSON state, the controller is configured to provide respective control signals to turn on the high-side switch 122 and turn off the low-side switch 124.

Figure 2:
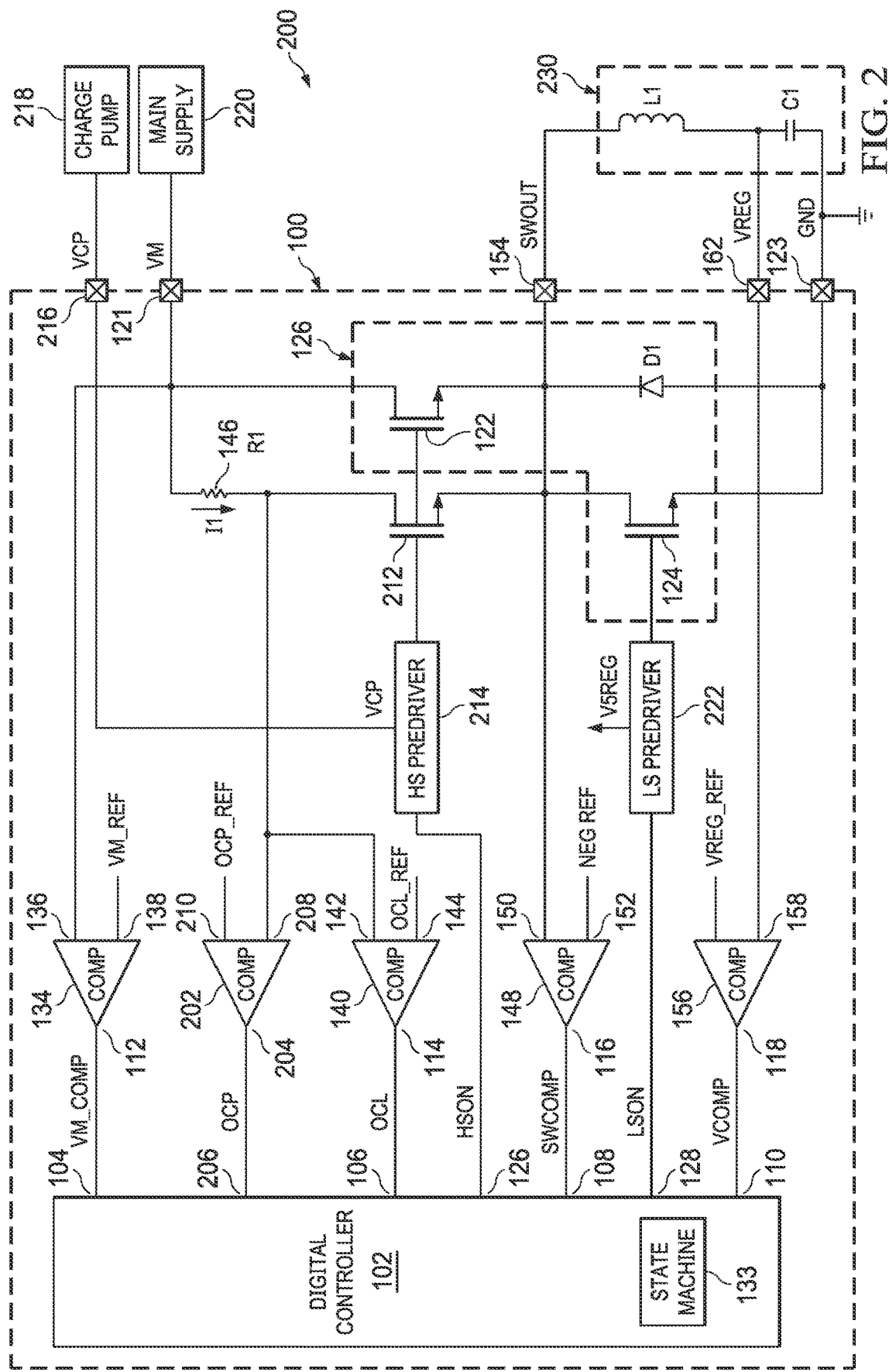
FIG. 2 illustrates another example of a power converter circuit.

FIG. 2 illustrates an example of a power supply system 200. The power supply system the power converter circuit 100 of FIG. 1. Accordingly, the description of FIG. 2 also refers to FIG. 1. In the example of FIG. 2, the power converter 100 is configured as a buck converter. In other examples, the converter 100 can be configured to implement other power converter topologies.

In the example of FIG. 2, the controller 102 is implemented as a digital controller, such as including logic configured to implement drive logic functions. The controller 102 having comparator inputs 104, 106, 108 and 110. The comparator inputs 104, 106, 108 and 110 are coupled to respective outputs 112, 114, 116 and 118 of comparators 134, 140, 148 and 156, respectively, as described herein.

In the example of FIG. 2, the output stage 120 includes respective transistors implemented as the high-side and low-side switches 122 and 124, respectively, coupled between the main supply terminal 121 and ground terminal 123. For example, the high-side and low-side switches 122 and 124 are implemented as power MOSFETs; though, other types of transistors could be used. A diode D1 is coupled in parallel with the low-side transistor 124 between the switch output terminal 154 and the ground terminal 123. The diode D1 is configured as a flyback diode to provide a current path for recirculating current when the high-side transistor 122 is turned off. The diode D1 can be a body diode of the low-side transistor 124 or a discrete diode.

Also, in the example of FIG. 2, the current sensor 146 is implemented as a resistor R1 and transistor 212, which are coupled in parallel with the high-side transistor 122. The gates of transistors 122 and 212 are coupled to the high-side control output 126 of controller. The transistor 212 and resistor R1 are configured (e.g., sized) so current I1 through the resistor provides a voltage drop across the resistor to supply a voltage signal to inputs 142 and 208 representative (e.g., proportional) to the current through the high-side transistor 122. The reference voltages OCP_REF and OCL_REF thus can be configured to set current thresholds according to the configuration of the current sensor 146.

As shown in FIG. 2, the high-side control output 126 is coupled to the gate of the high-side FET 122 through a predriver circuit 214. The predriver circuit 214 has a power input coupled to a terminal 216, which is coupled to a charge pump 218. The charge pump 218 is configured to provide a charge pump voltage, shown as VCP. In an example, the charge pump is coupled to a main power supply 220. The predriver circuit 214 is configured to amplify the HSON control signal to level sufficient to turn the high-side FET 122 on and off responsive to the HSON control signal provided at 126. Similarly, the low-side control output 128 is coupled to the gate of the low-side FET 124 through a predriver circuit 222. The predriver circuit 222 has a power input configured to receive a regulated voltage (e.g., about 5 V). The predriver circuit 222 is configured to amplify the LSON control signal to turn the low-side FET 124 on and off responsive to the LSON control signal provided at 128.

In the example of FIG. 2, the power converter also includes an overcurrent comparator 202 having an output 204 coupled to an input 206 of the controller 102. The comparator has inputs 208 and 210, in which the input 208 is coupled to current sensor (e.g., coupled to input 142 of current limit comparator 140) and the input 210 is configured to receive and overcurrent protection reference signal, shown as OCP_REF. For example, the overcurrent protection reference signal OCP_REF is greater than the current limit threshold OCL_REF (e.g., OCP_REF>OCL_REF), such as can be used to detect a short circuit condition. The comparator 202 is configured to provide an overcurrent protection signal at 204 responsive to the voltage signal at 208 exceeding the OCP_REF signal. The controller is further configured to detect an overcurrent condition and implement protective action (e.g., shut down of the converter 100) responsive to overcurrent protection signal at 204. In other examples, one or more additional protection comparators and can be implemented in the converter 100 and the controller 102 can be configured to implement protection action responsive to the output signals generated by such comparator(s).

Figure 3:
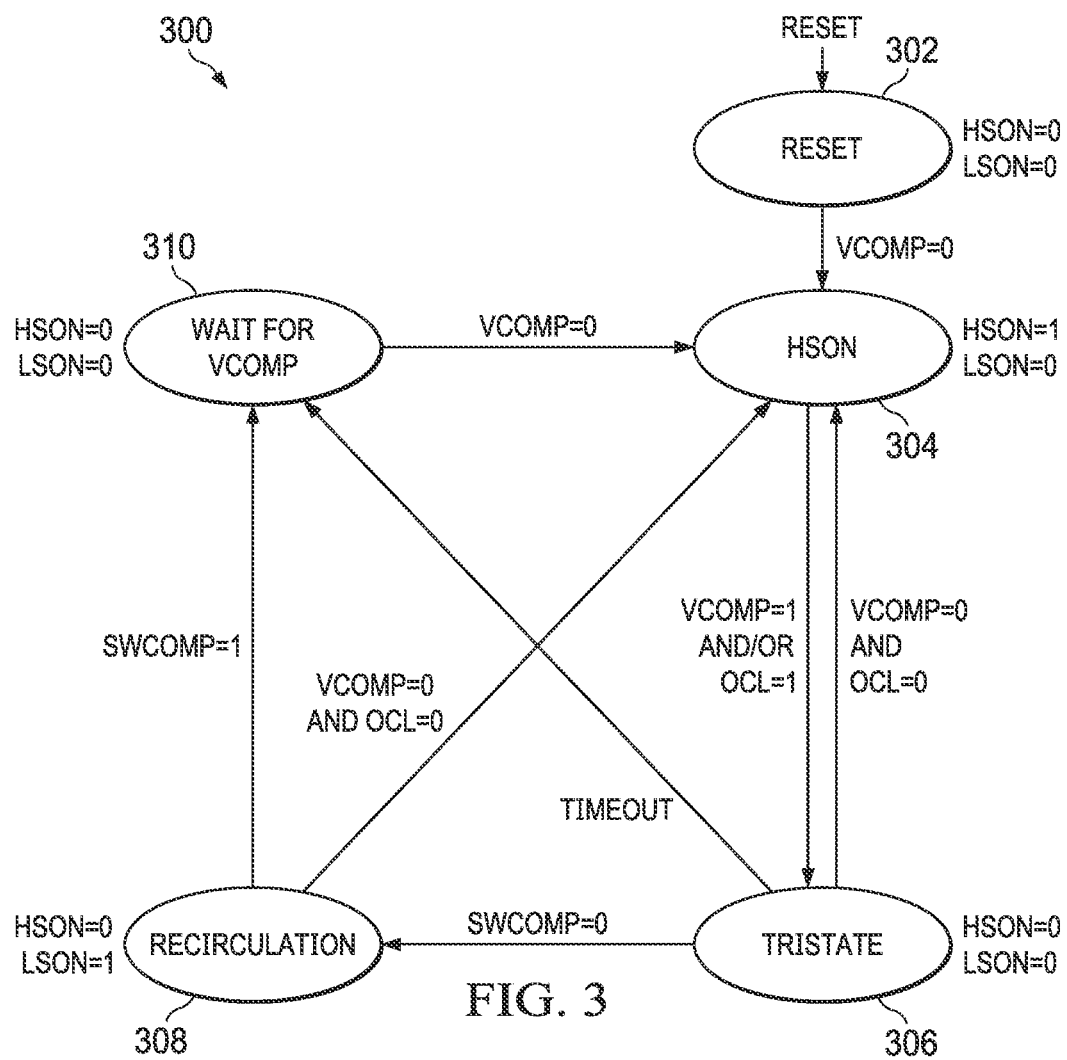
FIG. 3 illustrates an example state diagram that can be implemented by a controller in the circuits of FIGS. 1 and 2.

In the example of FIG. 2, a passive network 230 is coupled between the switch output terminal 154 and ground terminal 123. In an example where the converter 100 is implemented on an IC, the passive network 230 includes external components. As shown in FIG. 3, the passive network 230 includes an inductor L1 coupled between the switch output terminal 154 and the feedback terminal 162, and a capacitor C1 is coupled between the feedback terminal 162 and the ground terminal 123. In some examples, the inductor L1 could be replaced by a resistor, such as for use with a larger external load or to reduce power dissipation.

The digital controller 102 also includes a state machine 133 configured to control the state of the power converter 100 responsive to the comparator output signals at 104, 106, 108, 110 and 206. FIG. 3 is state diagram 300 showing example states and state transitions that can be implemented by the state machine 133 to control the power converter 100. As described herein, the states include a reset state 302, an HSON state 304, a tristate state 306, a recirculation state 308 and a wait for VCOMP state 310. The state diagram 300 shows conditions to be met to execute respective state transitions as well as the operation of the high-side and low-side switches (e.g., shown as HSON and LSON) for each state.

The state machine 133 is the reset state 302, such as at power up or responsive to a reset signal (e.g., from a microncontroller or other control circuit—not shown). In the reset state 302, HSON=0 and LSON=0. The state machine transitions from the reset state 302 to the HSON state responsive to VCOMP=0, which is representative of the regulated voltage VREG at 162 being less than the regulated reference voltage VREG_REF. In the HSON state 304, HSON=1 and LSON=0. Thus, current flows to through the inductor L1 to charge capacitor C1. Responsive to VCOMP=1 and/or OCL=1, the state machine 133 transitions from the HSON state 304 to the tristate state 306. As described herein, VCOMP=1 is representative of the regulated voltage VREG at 162 exceeding the regulated reference voltage VREG_REF, and OCL=1 is representative of the current I1 (through the high-side FET 122) exceeding a current limit threshold OCL_REF. In the tristate state 306, HSON=0 and LSON=0.

From the tristate state 306, if VMCOMP=1, the state machine 133 can enable transitions to the recirculation state 308 or the wait for VCOMP state 310. For example, the state machine 133 transitions to the recirculation state 308 responsive to SWCOMP=0. As described, SWCOMP=0 is representative of the voltage SWOUT at 154 being less than a negative reference NEG_REF, which occurs responsive to the high-side FET being turned off and current is pulled through diode D1. Alternatively, the state machine can transition to the wait for VCOMP state 310 responsive to a tristate timer (e.g., about 1 μs) timing out before transitioning to the recirculation state 308. From the tristate state 306, if VMCOMP=0, which is representative of a low supply voltage, the state machine 133 can enable a transition back to the HSON state 304 provided that both VCOMP=0 and OCL=0.

Also, from the recirculation state 308, if VMCOMP=1, the state machine 133 can transitions to the wait for VCOMP state 310 responsive to SWCOMP=1, which is representative of the voltage SWCOMP at 154 being greater than the negative reference NEG_REF, such as occurs following recirculation of current through diode D1. Alternatively, if VMCOMP=0, which is representative of the low supply voltage, the state machine 133 can enable a transition from the recirculation state 308 to the HSON state 304 provided that both VCOMP=0 and OCL=0. If the state machine reaches the wait for VCOMP state 310, the state machine is configured to transition to the HSON state 304 responsive to VCOMP=0. As a result of enabling transitions to the HSON state from the tristate and recirculation states 306 and 308, as described herein, the current and voltage ripple during low supply voltage conditions can be reduced compared to many existing approaches.

Figure 4:
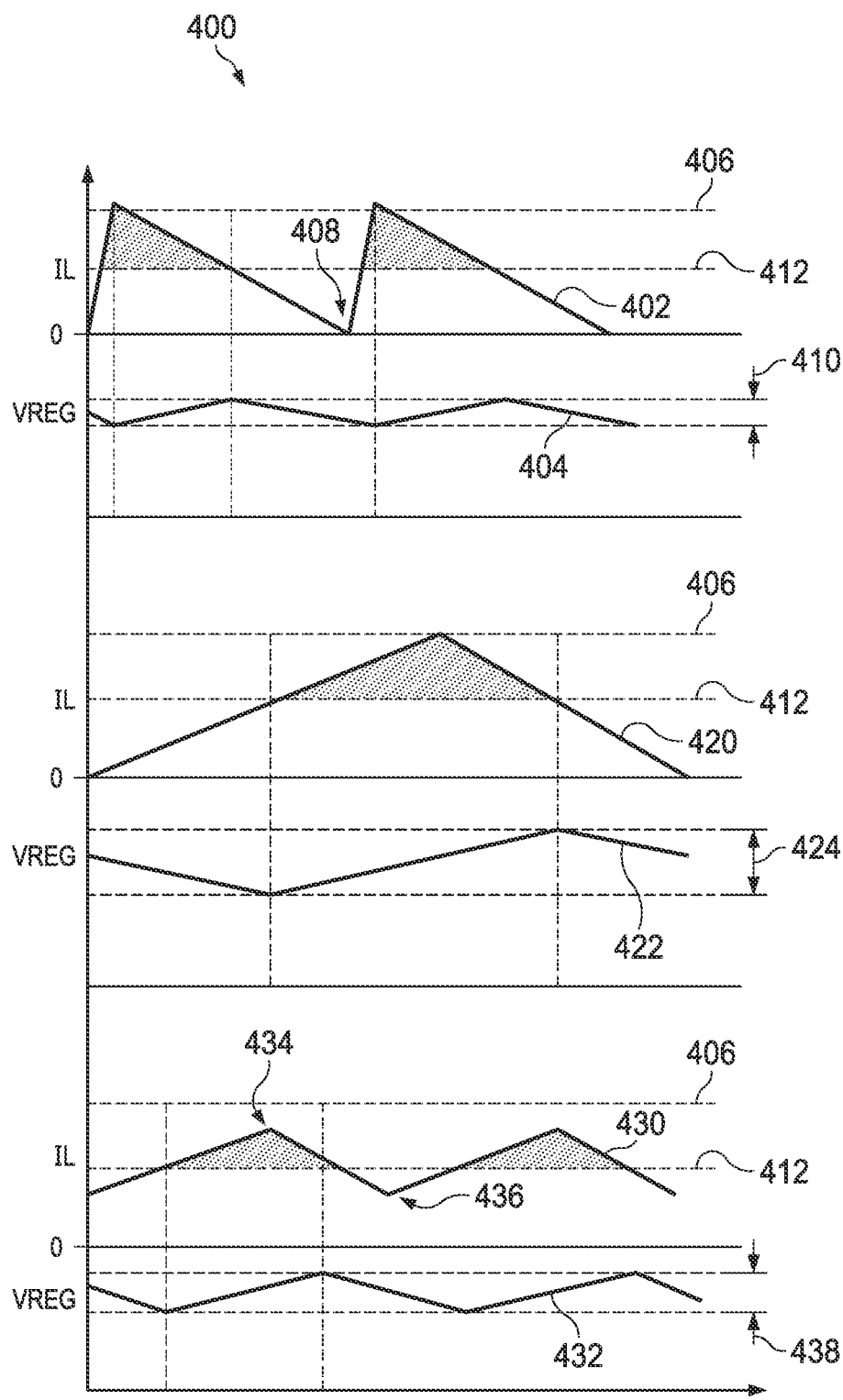
FIG. 4 illustrates an example signal diagram for the converter circuit of FIGS. 1 and 2.

FIG. 4 is a signal diagram 400 showing a comparison of inductor current IL and regulated voltage VREG for different power conversion approaches. The plots shown can be representative of signals from the circuit of FIG. 2. Accordingly, the description of FIG. 4 also refers to FIG. 2. For example, plots 402 and 404 of IL and VREG, respectively, are for a higher input supply voltage VM (e.g., about 35 V) compared to other plots shown in FIG. 4. For the higher input supply voltage, IL ramps up quickly to the current limit 406 responsive to the high-side FET being turned on (e.g., the HSON state). The inductor current IL then decreases to about 0 (e.g., during tristate and recirculation states). When the inductor current IL reaches about 0 (IL=0), the converter enters the wait for VCOMP state, and responsive to VCOMP=0, the high-side FET 122 turns back on, shown at 408, and the inductor current again increases up to the current limit 406, and the process continues as described above. Responsive to the inductor current IL charging the output capacitor C1, as shown by current waveform plot 402 the regulated voltage VREG shown in the plot 404 exhibits a ripple voltage, shown at 410. Additionally, the voltage VREG increases while the current IL is greater than an output load current, shown at 412, and decreases while the current IL is less than the load current.

The diagram 400 also includes plots 420 and 422 of IL and VREG, respectively, for a lower input supply voltage VM (e.g., about 6 V) used by a converter circuit implemented according to an existing control scheme. As shown, responsive to turning on the high-side FET 122 for an increased on-time and due to the lower voltage across the inductor, the inductor current IL 420 increases up to the current limit 406. The inductor current IL 420 also increases at a decreased rate compared to the higher voltage scenario of plot 402 because of the lower supply voltage VM. Responsive to the inductor current IL reaching the current limit 406, the high-side FET 122 is turned off and the inductor current decreases. As shown, the inductor current decreases at the same rate in 420 as at the higher voltage at 420. Also, while the current IL 420 is less than the output load current 412 the voltage VREG decreases, and while the current IL is greater than the output load current, the voltage VREG increases. Responsive to the inductor current IL charging the output capacitor C1, as shown by current waveform plot 420, the regulated voltage VREG 424 exhibits a ripple voltage, shown at 424. The existing control scheme thus results in voltage ripple 424 for the low supply voltage condition that is greater than the voltage ripple 410 that occurs for the higher supply voltage under the same control scheme. The ripple 424 results from an increased duration of the inductor current charging and discharging.

The diagram 400 further includes plots 430 and 432 of IL and VREG, respectively, for a lower input supply voltage VM (e.g., about 6 V) used by a converter circuit 100 implemented according to the examples described herein. As shown, responsive to turning on the high-side FET 122, the inductor current IL 420 increases up to the current limit 406. The rate of increase in the plot 430 is the same as the rate for the current plot 420 in the existing approach. However, instead of increasing up to the current limit 406, the current only increases until VCOMP=1, shown at 434, which is representative of VREG reaching its reference voltage VREG_REF. Thus, at 434, the converter turns off the high-side FET 122, and the inductor current decreases until VCOMP=0 and OCL=0, shown at 436, which is representative of VREG dropping below its reference voltage VREG_REF and an the current being less than the current limit threshold. The inductor current IL 430 decreases (between 434 and 436) at the same rate as shown in the plots 402 and 420. Also, as shown in the voltage plot 432, the regulated voltage VREG increases and decreases, responsive to the inductor current IL charging the output capacitor C1. The regulated voltage VREG 432 exhibits a voltage ripple, shown at 438. The voltage ripple 438 for the low supply voltage condition is less than the voltage ripple 424 that occurs for the same low supply voltage but under the existing control scheme. The reduced ripple 424 results from a reduced duration of the inductor current IL charging and discharging the capacitor C1. As a result, a power converter implementing the approach described herein can operate with reduced ripple over a wider range of supply voltages (e.g., from about 4 V to about 40 V) compared to a power converter using an existing control scheme.

Figure 5:
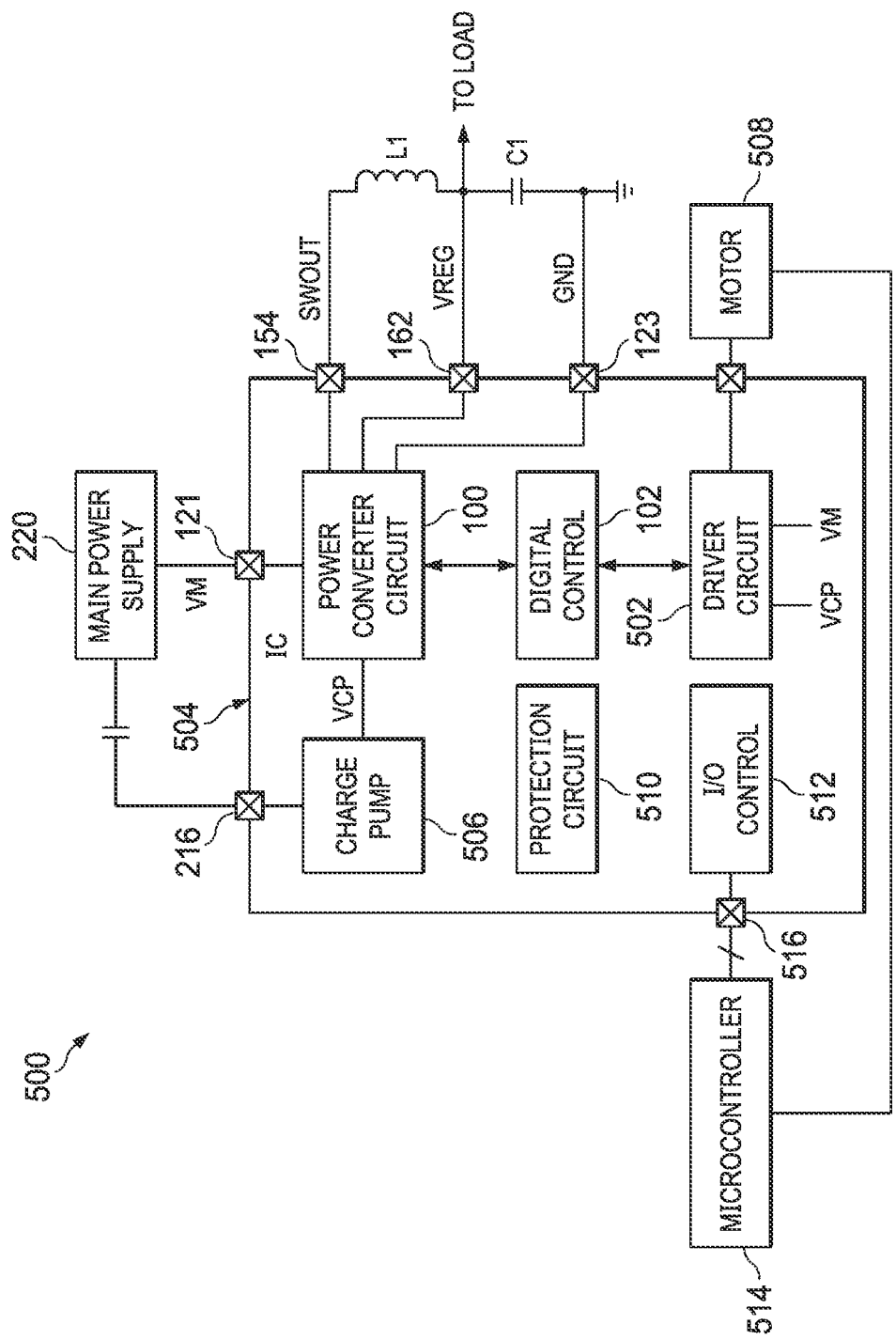
FIG. 5 illustrates an example drive system that includes a power converter circuit.

FIG. 5 illustrates an example of system 500 that includes a power converter circuit 100 integrated with a driver circuit 502 in an IC 504. The power converter 100 can be implemented according to the examples described herein with respect to FIGS. 1-4. Accordingly, the description of FIG. 5 also refers to FIGS. 1-4. In the example of FIG. 5, inductor L1 and capacitor C1 are coupled between switch output and ground terminals 154 and 120, respectively. The power converter circuit 100 also has the supply terminal 121 coupled to a main power supply 220, which is configured to provide supply voltage VM. In an example, the power converter circuit 100 can be implemented as a buck regulator configured to provide a regulated DC output voltage VREG to a load. Feedback terminal 162 can be coupled to the terminal interconnecting L1 and C1 to receive VREG, which is representative of the voltage across the capacitor C1 (between terminals 162 and 120). As described herein, the power converter circuit (e.g., a buck regulator) 100 is configured to implement a control scheme at low supply voltages (e.g., less than 12 V) in which the regulated output voltage VREG is provided with reduced ripple voltage compared to existing approaches.

The IC 504 also includes digital control 102, which is configured to control the power converter 100 and the driver circuit 502. The IC 504 also can include a charge pump 506 coupled to the main power supply 220 through a charge pump terminal 216. A capacitor or other external components can be coupled between the charge pump terminal 216 and the main power supply 220. The charge pump 506 can be configured to provide a charge pump voltage VCP to respective inputs of the power converter circuit 100 and the driver circuit 502. The driver circuit 502 can also have an input coupled to the main supply terminal 121 to receive the input supply voltage VM. In the example of FIG. 5, the driver circuit 502 is configured to drive a DC motor 508. For example the motor 508 can be a motor implemented in a variety of applications, such as CPAP machines, brushless DC motor modules, printers, camera gimbals, HVAC motors, office automation machines, factory automation or robotics, automotive LIDAR or other applications.

The IC 504 can also include built-in protection circuitry 510. For example, the protection circuitry 510 is configured to implement one or more protection features, which can include overcurrent protection, thermal warning and shutdown, VM undervoltage lockout, charge pump under voltage as well as other protection features. The IC 504 can also include input/output (I/O) control circuit 512 to enable communication with an external controller, such as a microcontroller 514. For example, the IC 504 includes one or more I/O terminals 516 configured to communicate commands and data between the microcontroller 514 and the I/O control circuit 512. The I/O control 512 thus can be configured to route commands to the digital control 102 for controlling the power converter 100 and/or the driver circuit 502.

In this application, the term "couple" or "couples" means either an indirect or direct connection. Thus, if a first device couples to a second device, that connection may be through a direct connection or through an indirect connection via other devices and connections. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

The recitation "responsive to" means "responsive at least in part to." Therefore, if X is responsive to Y, X may be a function of Y only or a function of Y and any number of other factors. Also, the recitation "based on" means "based at least in part on." Therefore, if X is based on Y, X may be a function of Y only or a function of Y and any number of other factors.

Modifications are possible in the described embodiments, and other embodiments are possible, within the scope of the claims.

What is claimed is:

1. A circuit comprising:
   a supply comparator having a supply input, a supply reference input and a supply comparator output, the supply input coupled to a supply input terminal, the supply reference input configured to receive a supply reference voltage;
   a controller having a comparator input, a high-side output and a low-side output, the comparator input coupled to the supply comparator output;
   a high-side switch having a control input, the high-side switch coupled between the supply input and a switch output terminal, the high-side output coupled to the control input of the high-side switch;
   a low-side switch having a control input, the low-side switch coupled between the switch output terminal and a ground terminal, the low-side output coupled to the control input of the low-side switch;
   a current limit comparator having a current input, a current reference input and a current comparator output, the current input configured to receive a current signal representative of current through the high-side switch, the current reference input configured to receive a current reference signal, the current comparator output coupled to a current control input of the controller;
   a switch comparator having a switch input, a switch reference input and a switch comparator output, the switch input coupled to the switch output terminal, the switch reference input configured to receive a negative reference signal, the switch comparator output coupled to a switch control input of the controller; and
   a feedback comparator having a regulated voltage input, a feedback reference input and a feedback comparator output, the regulated voltage input coupled to a feedback terminal, the feedback reference input configured to receive a feedback reference voltage, the feedback comparator output coupled to a feedback input of the controller.

2. The circuit of claim 1, wherein the controller is configured to provide a high-side control signal at the high-side output and a low-side control signal at the low-side output responsive to signals at the supply comparator output, the current comparator output, the switch comparator output and the feedback comparator output.

3. The circuit of claim 2, wherein the controller is configured to provide the high-side control signal to turn on the high-side switch responsive to a signal at the supply comparator output representative of when the supply reference voltage is less than a reference supply voltage and when signals at both the current comparator output and the feedback comparator output are representative of the current input and the feedback input being less than respective references.

4. The circuit of claim 3, wherein the controller includes a state machine having a high-side on state (HSON) and a tristate state, the state machine configured to transition from HSON state, in which the high-side switch is on and the low-side switch is off, to the tristate state, in which both the high-side and low-side switches are off, responsive to at least one of the signals at the current comparator output and the feedback comparator output being representative the current input or the feedback input being greater than the respective references.

5. The circuit of claim 4, wherein the state machine configured to transition from the tristate state to the HSON state responsive to the signal at the supply comparator output being representative of when a voltage at the supply input is less than the reference supply voltage at the supply reference input and when the signals at the current comparator output and the feedback comparator output are representative of both the current input and the feedback input being less than reference voltages at the respective current reference and feedback reference inputs.

6. The circuit of claim 4, wherein
the state machine configured to transition from the tristate state to a recirculation state, in which the high-side switch is off and the low-side switch is on, responsive to the switch comparator output being representative of a negative voltage at the switch output terminal, and
the state machine configured to transition from the recirculation state to the HSON state responsive to the signal at the supply comparator output being representative of when a voltage at the supply input is less than the reference supply voltage at the supply reference input and when the signals at the current comparator output and the feedback comparator output are representative of both the current input and the feedback input being less than reference voltages at the respective current reference and feedback reference inputs.

7. The circuit of claim 1, wherein the circuit further comprises:
an inductor or resistor coupled between the switch output terminal and the feedback terminal; and
a capacitor coupled between the feedback terminal and the ground terminal, wherein the feedback terminal is adapted to be coupled to a load.

8. The circuit of claim 1, wherein the circuit is implemented as an integrated circuit comprising a substrate, in which the supply comparator, the controller, the high-side switch and the low-side switch are implemented on the substrate.

9. The circuit of claim 8, wherein each of the high-side switch and the low-side switch comprise respective field effect transistors.

10. A power converter circuit comprising:
an output stage including high-side and low-side switches coupled between a supply terminal and a ground terminal;
a controller configured to provide high-side and low-side control signals to operate the output stage to provide a regulated voltage responsive to an operating state of the controller, wherein the controller is configured to transition from an intermediate state to a high-side on (HSON) state, in which the high-side control signal is provided to turn on the high-side switch, responsive to (i) the supply terminal having a voltage less than a supply voltage threshold, (ii) the regulated voltage having a voltage less than a regulated voltage threshold, and (iii) current through the high-side switch being less than a current limit threshold;
a current limit comparator configured to provide a current comparator output signal to the controller responsive to a comparison of a signal representative of the current through the high-side switch and the current limit threshold;
a switch comparator configured to provide a switch comparator output signal to the controller responsive to a comparison of a signal representative of the voltage at a switch output terminal and a switch reference voltage; and
a feedback comparator configured to provide a feedback comparator output signal to the controller responsive to a comparison of a signal representative of the regulated voltage at a feedback terminal and the regulated voltage threshold.

11. The circuit of claim 10, further comprising a supply comparator configured to determine a comparison of the voltage at the supply terminal and the supply voltage threshold and provide a comparator output signal to the controller responsive to the comparison.

12. The circuit of claim 10, wherein the intermediate state comprises a tristate state, the controller configured to transition to from the HSON state to the tristate state responsive to at least one of the regulated voltage being greater than the regulated voltage threshold or the current through the high-side switch greater than the current limit threshold.

13. The circuit of claim 12, wherein the switch output terminal is coupled to an output of the output stage between the high-side and low-side switches, wherein the intermediate state comprises a recirculation state, the controller configured to transition to from the tristate state to the recirculation state responsive to a voltage at the switch output terminal being less than a negative reference voltage.

14. The circuit of claim 10, further comprising:
an inductor or resistor coupled between the switch output terminal and the feedback terminal; and
a capacitor coupled between the feedback terminal and the ground terminal.

15. The circuit of claim 10, wherein the circuit is implemented as an integrated circuit comprising a substrate, in which the output stage and the controller are implemented on the substrate.

16. A system comprising:
a main power supply having a supply output, the main power supply configured to provide a supply voltage at the supply output;
a power converter comprising:
an output stage including high-side and low-side switches coupled between a supply terminal and a ground terminal, each of the high-side and low-side switches coupled to a switch output terminal, and the supply terminal coupled to the supply output; and
a controller configured to provide high-side and low-side control signals to operate the output stage to provide a regulated voltage at a feedback terminal responsive to an operating state of the controller, wherein the controller is configured to enable a direct transition from an intermediate state, in which the high-side switch is off, to a high-side on (HSON) state, in which the high-side control signal is provided to turn on the high-side switch, responsive to the supply voltage being less than a low supply voltage threshold;

an inductor or resistor coupled between the switch output terminal and the feedback terminal;

a capacitor coupled between the feedback terminal and the ground terminal;

a current limit comparator configured to provide a current comparator output signal to the controller responsive to a comparison of a signal representative of current through the high-side switch and a current limit threshold;

a switch comparator configured to provide a switch comparator output signal to the controller responsive to a comparison of a signal representative of the voltage at the switch output terminal and a switch reference voltage; and a feedback comparator configured to provide a feedback comparator output signal to the controller responsive to a comparison of a signal representative of a regulated voltage and a regulated voltage threshold.

17. The system of claim 16, wherein the controller is further configured to transition from the intermediate state to the HSON state responsive to (i) the regulated voltage having a voltage less than the regulated voltage threshold, and (ii) current through the high-side switch being less than the current limit threshold.

18. The system of claim 17, wherein the power converter further comprises a supply comparator configured to provide a comparator output signal to the controller responsive to a comparison of the voltage at the supply terminal and the low supply voltage threshold.

19. The system of claim 16, wherein the power converter is implemented as an integrated circuit comprising a substrate, in which the output stage and the controller are implemented on the substrate.

* * * * *